US010744643B2

(12) United States Patent
Xiong et al.

(10) Patent No.: US 10,744,643 B2
(45) Date of Patent: Aug. 18, 2020

(54) ROBOT SERVO JITTER SUPPRESSION METHOD AND DEVICE

(71) Applicant: UBTECH Robotics Corp, Shenzhen (CN)

(72) Inventors: Youjun Xiong, Shenzhen (CN); Lifu Zhang, Shenzhen (CN); Wenhua Fan, Shenzhen (CN); Zhenmin Mo, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 195 days.

(21) Appl. No.: 15/960,571

(22) Filed: Apr. 24, 2018

(65) Prior Publication Data

US 2019/0160669 A1    May 30, 2019

(30) Foreign Application Priority Data

Nov. 24, 2017    (CN) .......................... 2017 1 1190135

(51) Int. Cl.
| | |
|---|---|
| *B25J 9/16* | (2006.01) |
| *G05B 13/02* | (2006.01) |
| *B25J 9/12* | (2006.01) |

(52) U.S. Cl.
CPC .......... *B25J 9/1653* (2013.01); *G05B 13/024* (2013.01); *B25J 9/126* (2013.01); *Y10S 901/23* (2013.01)

(58) Field of Classification Search
CPC ............................. B25J 9/1653; G05B 13/024
USPC ........................................................ 700/280
See application file for complete search history.

(56) References Cited

U.S. PATENT DOCUMENTS

| | | | | |
|---|---|---|---|---|
| 5,323,309 | A * | 6/1994 | Taylor | G05B 19/33 318/563 |
| 6,339,734 | B1 * | 1/2002 | Liu | B64G 1/24 244/164 |
| 2003/0227845 | A1 * | 12/2003 | Park | G11B 7/0956 369/53.19 |
| 2016/0127646 | A1 * | 5/2016 | Osborne | H04N 5/2251 348/208.2 |

FOREIGN PATENT DOCUMENTS

| | | |
|---|---|---|
| CN | 107116556 A | 9/2017 |
| JP | 2000078875 A * | 3/2000 |

* cited by examiner

*Primary Examiner* — Mohammad Ali
*Assistant Examiner* — Joshua T Sanders

(57) ABSTRACT

The present disclosure provides a robot servo jitter suppression method and device. The method includes: counting an amount of reciprocating jitter of an angular position of an output shaft of a robot servo in a predetermined period, after the robot servo enters a lock position state for a first predetermined period; determining whether the robot servo is in a jitter state according to the amount of the reciprocating jitter of the angular position of the output shaft of the robot servo and a predetermined fluctuation value; and suppressing the jitter of the robot servo by adjusting control parameter(s) of the robot servo, in response to the robot servo being in the jitter state. The robot servo jitter suppression method and device solve the problem of the jitter of the robot servo appears when the virtual positions of the robot servo and the robot joint structure are not properly controlled.

12 Claims, 3 Drawing Sheets

ROBOT SERVO JITTER SUPPRESSION METHOD AND DEVICE

CROSS REFERENCE TO RELATED APPLICATIONS

This application claims priority to Chinese Patent Application No. 201711190135.9, filed Nov. 24, 2017, which is hereby incorporated by reference herein as if set forth in its entirety.

BACKGROUND

1. Technical Field

The present disclosure relates to robot servo control technology, and particularly to a robot servo jitter suppression method and device.

2. Description of Related Art

The problem of the servo jitter in robot joints has always been one of the difficult technical problems for robot technology. There are three major causes including the poor control software of the servo itself as well as the large virtual position of the mechanical structure of the servo itself and the robot joint. At present, since the virtual position of the mechanical structure of the servo itself and the robot joint relate to many factors such as materials, processing techniques, machining accuracy, and product cost, which is not easy to solve, and the problem of the robot servo jitter appears while the virtual position of the mechanical structure of the servo and the robot joint are not properly controlled.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, the technical solutions in the embodiments of the present disclosure will be described clearly and completely with reference to the drawings in the embodiments of the present disclosure. Apparently, the described embodiments are some but not all of the embodiments of the present disclosure. All other embodiments obtained by those skilled in the art based on the embodiments of the present disclosure without creative efforts shall fall within the protection scope of the present disclosure.

Figure 1:
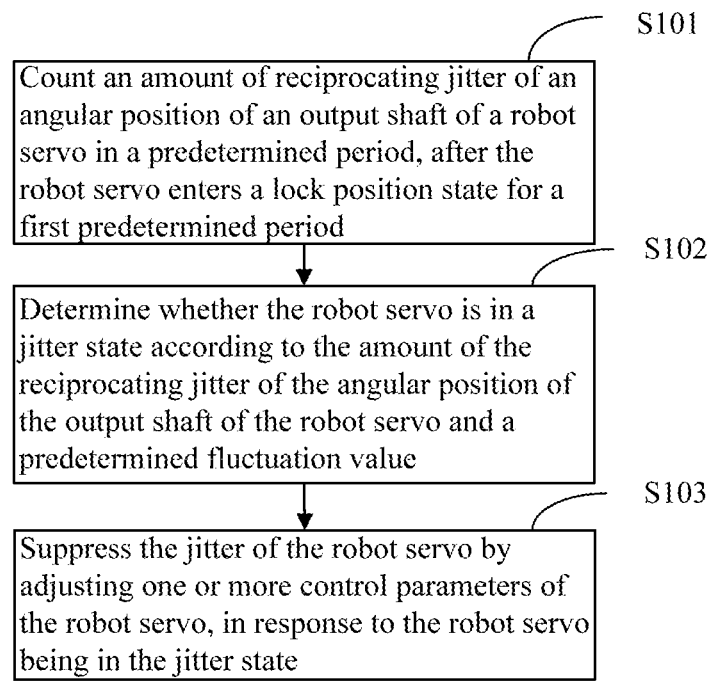
FIG. 1 is a flow chart of a robot servo jitter suppression method according to an embodiment of the present disclosure.

FIG. 1 is a flow chart of a robot servo jitter suppression method according to an embodiment of the present disclosure. In this embodiment, the method is a computer-implemented method executable for a processor. The method can be applied to robots and other electronic devices such as cell phones, tablet computers, notebook computers, and cloud servers. As shown in FIG. 1, the method includes the following steps.

S101: counting an amount of reciprocating jitter of an angular position of an output shaft of a robot servo in a predetermined period, after the robot servo enters a lock position state for a first predetermined period.

In this embodiment, the lock position state of the robot servo is an operation state which starts after the robot servo is locked. After the robot servo enters the lock position state for the first predetermined period, the detection for whether the robot servo is in a jitter state is started, in which the amount (times) of the reciprocating jitter of the angular position of the output shaft of the robot servo in the predetermined period is counted first.

Optionally, before step S101, the method may include: detecting a deviation angle which is the difference between a current movement angle and a target angle of the output shaft of the robot servo; comparing whether the deviation angle is greater than a predetermined deviation threshold; and adjusting control parameter(s) of the robot servo so that the deviation angle falls within the predetermined deviation threshold, if the deviation angle is greater than the predetermined deviation threshold. In this embodiment, each of the control parameter(s) is a parameter of an automatic control related algorithm. The algorithm includes, but is not limited to an algorithm such as a PID, a fuzzy control, an optimal control, and an adaptive control, and the rigid changes of the servo is controlled through the control parameter(s).

In this embodiment, the deviation angle of (the output shaft of) the robot servo is the difference between the current movement angle and the target angle of the output shaft of the robot servo. Whether the control parameter(s) of the robot servo need to be adjusted is determined according to whether the deviation angle of the robot servo is greater than the predetermined deviation threshold, and a maximum deviation angle of the robot servo can be effectively controlled through the steps. As shown in FIG. 1, the deviation angle of the output shaft of the robot servo is detected, and whether the deviation angle of the robot servo is greater than the predetermined deviation threshold is determined. If the deviation angle of the output shaft of the robot servo is greater than the predetermined deviation threshold, the control parameter(s) of the robot servo are adjusted, so that the deviation angle of the servo falls into the predetermined deviation threshold; otherwise, the control parameter(s) of the robot servo will not be adjusted.

Specifically, in step S101, counting the amount (times) of reciprocating jitter of the angular position of the output shaft of the robot servo in the predetermined period includes:

determining whether a current jitter rotation direction of the output shaft is identical with a last jitter rotation direction every once in a unit time within the predetermined period; and increasing the amount (times) of the reciprocating jitter of the angular position of the output shaft of the robot servo by 1, if the current jitter rotation direction is not identical with the last jitter rotation direction. Wherein the determining whether the current jitter rotation direction is identical with the last jitter rotation direction includes: determining whether a current angular position is identical with a last angular position; determining that the current jitter rotation direction is identical with the last jitter rotation direction, if the current angular position is identical with the last angular position; and determining whether a current servo angle is greater than a last servo angle, and determining that the current jitter rotation direction is positive if the current servo angle is greater than the last servo angle while determining that the current jitter rotation direction is negative if the current servo angle is not greater than the last servo angle.

Figure 2:
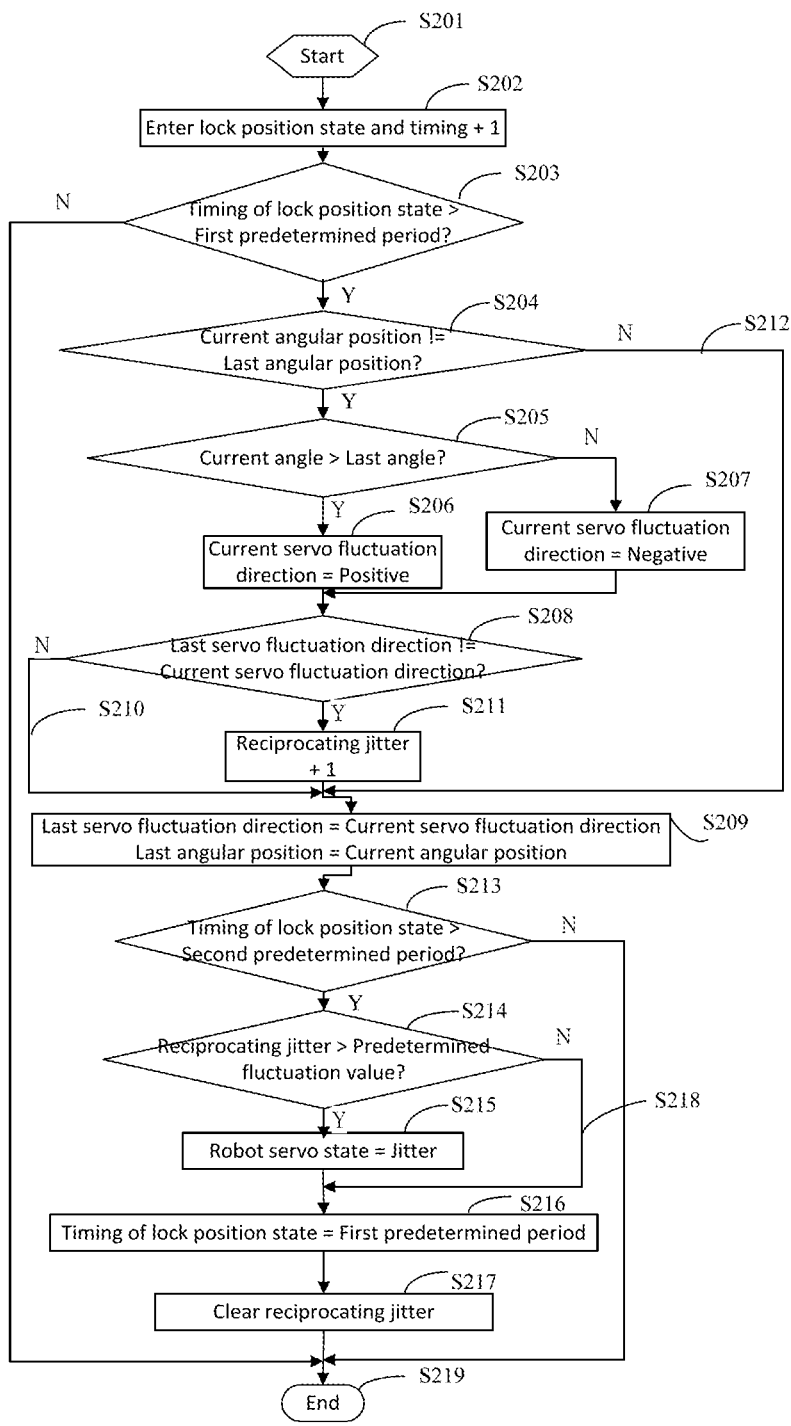
FIG. 2 is a flow chart of determining whether a robot servo is in a jitter state according to an embodiment of the present disclosure.

In this embodiment, a second predetermined period is set. In which, the second predetermined period is equal to the first predetermined period plus the predetermined period. FIG. 2 is a flow chart of determining whether a robot servo is in a jitter state according to an embodiment of the present disclosure. As shown in FIG. 2, after the robot servo enters the lock position state, a timer is started and incremented by 1 to determine the magnitude of the counted time and the first predetermined period. If it is determined that the magnitude of the counted time is less than or equal to the first predetermined period, the amount of the reciprocating jitter of the angular position of the output shaft of the robot servo in the predetermined period is not counted, that is, the robot servo is not counted to be in the jitter state when it just enters the lock position state to be unstable; if the magnitude of the counted time is greater than the first predetermined period, it is determined whether the current angular position is identical with the last angular position.

If the current angular position is identical with the last angular position, it is determined that the current robot servo fluctuation direction is identical with the last robot servo fluctuation direction, and the last robot servo fluctuation direction is set as the current robot servo fluctuation direction, and the last angular position is set as the current angular position, which is for determining whether the current robot servo fluctuation direction is identical with the last robot servo fluctuation direction and whether the current angular position is identical with the last angular position in the next time.

If the current angular position is not identical with the last angular position, the magnitude of the current servo angle and the last servo angle are compared. If the current servo angle is greater than the last servo angle, it is determined that the current robot servo fluctuation direction is positive; if the current servo angle is smaller than or equal to the last servo angle, it is determined that the current robot servo fluctuation direction is negative, and continues to determine whether the current robot servo fluctuation direction is identical with the last robot servo fluctuation direction. If the current robot servo fluctuation direction is identical with the last robot servo fluctuation direction, the last robot servo fluctuation direction is set as the current robot servo fluctuation direction, and the last angular position is set as the current angular position, which is for determining whether the current robot servo fluctuation direction is identical with the last robot servo robot fluctuation direction and whether the current angular position is identical with the last angular position in the next time; if the current robot servo fluctuation direction is not identical with the last robot servo fluctuation direction, the amount of the reciprocating jitter of the angular position of the output shaft of the robot servo is increased by 1, and the last robot servo fluctuation direction is set as the current robot servo fluctuation direction, the last angular position is set as the current angular position, which is for determining whether the current robot servo fluctuation direction is identical with the last robot servo fluctuation direction and whether the current angular position is identical with the last angular position in the next time.

S102: determining whether the robot servo is in the jitter state according to the amount of the reciprocating jitter of the angular position of the output shaft of the robot servo and a predetermined fluctuation value.

Specifically, step S102 includes:

determining whether the amount of the reciprocating jitter of the angular position of the output shaft of the robot servo is greater than the predetermined fluctuation value; and determining that the robot servo is in the jitter state, if the amount of the reciprocating jitter of the angular position of the output shaft of the robot servo is greater than the predetermined fluctuation value.

In this embodiment, as shown in FIG. 2, if the timing of the lock position state is greater than the second predetermined period, the amount of the reciprocating jitter of the angular position of the output shaft of the robot servo counted in the predetermined period and the predetermined fluctuation value are compared. If the amount of the reciprocating jitter of the angular position of the output shaft of the robot servo is greater than the predetermined fluctuation value, it is determined that the robot servo is in the jitter state, the timing of the lock position state is set as the first predetermined period, and the amount of reciprocating jitter of the angular position of the output shaft of the robot servo is cleared to zero so as to terminate the detection of whether the robot servo is in the jitter state. If the amount of reciprocating jitter of the angular position of the output shaft of the robot servo is smaller than or equal to the predetermined fluctuation value, the timing of the lock position state is set as the first predetermined period, and the amount of reciprocating jitter of the angular position of the output shaft of the robot servo is cleared to zero so as to terminate the detection of whether the robot servo is in the jitter state.

As shown in FIG. 2, in this embodiment, the determining whether the robot servo is in the jitter state can be implemented through steps S201-S219:

S201: starts;

S202, the robot servo enters the lock position state, and the timing is increased by 1;

S203, it is determined whether the timing of the lock position state is greater than the first predetermined period, which is represented as the timing of the lock position state> the first predetermined period?;

S204, if yes, it is determined whether the current angular position is not identical with the last angular position, which is represented as the current angular position !=the last angular position?;

S205: if the current angular position is not identical with the last angular position, it is determined whether the current servo angle is greater than the last servo angle, which is represented as the current servo angle> the last servo angle?;

S206, if the current servo angle is greater than the last servo angle, it is determined that the current robot servo fluctuation direction is positive, which is represented as the current servo fluctuation direction=positive;

S207, if the current servo angle is smaller than or equal to the last servo angle, it is determined that the current robot servo fluctuation direction is negative, which is represented as the current servo fluctuation direction=negative;

S208, it is determined whether the current robot servo fluctuation direction is inconsistent with the last robot servo fluctuation direction, which is represented as the last servo fluctuation direction !=the current servo fluctuation direction?;

S209, the last robot servo fluctuation direction is set as the current robot servo fluctuation direction, and the last angular position is set as the current angular position, which is represented as the last servo fluctuation direction=the current servo fluctuation direction, the last angular position=the current angular position;

S210, if the current robot servo fluctuation direction is consistent with the last robot servo fluctuation direction, step S209 is executed;

S211, if the current robot servo fluctuation direction is inconsistent with the last robot servo fluctuation direction, the amount of the reciprocating jitter of the angular position of the output shaft of the robot servo is increased by 1, and step S209 is executed;

S212, if the current angular position is consistent with the last angular position, it is determined that the current servo fluctuation direction is consistent with the last servo fluctuation direction, and step S209 is executed;

S213, it is determined whether the timing of the lock position state is greater than the second predetermined period, which is represented as the timing of the lock position state> the second predetermined period?;

S214: if the timing of the lock position state is greater than the second predetermined period, it is determined whether the amount of the reciprocating jitter of the angular position of the output shaft of the robot servo is greater than the predetermined fluctuation value, which is represented as the amount of the reciprocating jitter> the predetermined fluctuation value?;

S215: if the amount of the reciprocating jitter of the angular position of the output shaft of the robot servo is greater than the predetermined fluctuation value, it is determined that the robot servo is in the jitter state, which is represented as robot servo state=jitter.

S216: the timing of the lock position state is set as the first predetermined period, which is represented as the timing of the lock position state=the first predetermined period;

S217: the amount of the reciprocating jitter of the angular position of the output shaft of the robot servo is cleared to zero;

S218, if the amount of the reciprocating jitter of the angular position of the output shaft of the robot servo is not greater than the predetermined fluctuation value, step S216 is executed;

S219: ends, and if the timing of the lock position state is not greater than the second predetermined period, the detection of whether the robot servo is in the jitter state is terminated.

S103: suppressing the jitter of the robot servo by adjusting the control parameter(s) of the robot servo, if the robot servo is in the jitter state.

Furthermore, step S103 includes:

determining whether the control parameter(s) of the robot servo have reached a lower limit, if the robot servo is in the jitter state; and decreasing the control parameter(s) of the robot servo by 1, if the lower limit is not reached.

In this embodiment, as shown in FIG. 1, if the robot servo is in the jitter state, it is determined whether the control parameter(s) of the robot servo has reached the lower limit. If the lower limit is not reached, the control parameter(s) of the robot servo are decreased by 1, and the adjustment of the control parameter(s) of the robot servo is terminated.

In this embodiment, the method does not perform the detection of whether the robot servo is in the jitter state when the first predetermined period is not reached after the robot servo enters the lock position state, and the amount of the reciprocating jitter of the angular position of the output shaft of the robot servo in the predetermined period is counted after the robot servo enters the lock position state for the first predetermined period. The degree of the jitter of the robot servo in the lock position state is detected by comparing the amount of the reciprocating jitter of the angular position of the output shaft of the robot servo and the magnitude of the predetermined fluctuation value, and the control parameter(s) of the robot servo are adjusted according to the degree of the jitter to achieve the jitter suppression of the robot servo.

Figure 3:
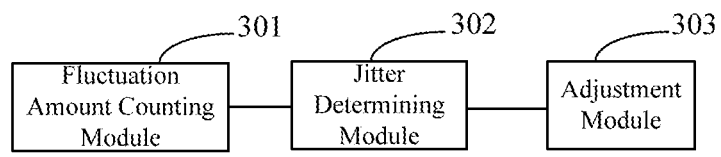
FIG. 3 is a schematic diagram of a robot servo jitter suppression device according to an embodiment of the present disclosure.

FIG. 3 is a schematic diagram of a robot servo jitter suppression device according to an embodiment of the present disclosure. As shown in FIG. 1, the device includes a processor and a memory storing instructions executable for the processor, in which the instructions function as:

a fluctuation amount counting module 301 configured to count an amount of reciprocating jitter of an angular position of a output shaft of a robot servo in a predetermined period, after the robot servo enters a lock position state for a first predetermined period;

a jitter determining module 302 configured to determine whether the robot servo is in a jitter state according to the amount of the reciprocating jitter of the angular position of the output shaft of the robot servo and a predetermined fluctuation value; and an adjustment module 303 configured to suppress the jitter of the robot servo by adjusting control parameter(s) of the robot servo, if the robot servo is in the jitter state.

In this embodiment, by configuring the fluctuation amount counting module 301, the jitter determining module 302, and the adjustment module 303, the detection of whether the robot servo is in the jitter state is not performed when the first predetermined period is not reached after the robot servo enters the lock position state, and the amount of the reciprocating jitter of the angular position of the output shaft of the robot servo in the predetermined period is counted after the robot servo enters the lock position state for the first predetermined period. The degree of the jitter of the robot servo in the lock position state is detected by comparing the amount of the reciprocating jitter of the angular position of the output shaft of the robot servo and the magnitude of the predetermined fluctuation value, and the control parameter(s) of the robot servo are adjusted according to the degree of the jitter to achieve the jitter suppression of the robot servo.

Specifically, the fluctuation amount counting module 301 is further configured to: detect a deviation angle of the difference between a current movement angle and a target angle of the output shaft of the robot servo, before the counting the amount of the reciprocating jitter of the angular position of the output shaft of the robot servo in the predetermined period; compare whether the deviation angle is greater than a predetermined deviation threshold; and adjust the control parameter(s) of the robot servo so that the deviation angle falls within the predetermined deviation threshold, if the deviation angle is greater than the predetermined deviation threshold.

In this embodiment, whether or not the control parameter(s) of the robot servo need to be adjusted is determined according to whether the deviation angle of the robot servo is greater than the predetermined deviation threshold, and it is ensured that the maximum deviation angle of the robot servo can be effectively controlled through the step. As shown in FIG. 1, it starts to detect the deviation angle of the robot servo and determines whether the deviation angle of the robot servo is greater than the predetermined deviation threshold. If the deviation angle of the robot servo is greater than the predetermined deviation threshold, the control parameter(s) of the robot servo are adjusted so that the deviation angle of the servo falls within the predetermined deviation threshold; otherwise, the control parameter(s) of the robot servo will not be corrected.

Optionally, the fluctuation amount counting 301 is specifically configured to:

determine whether a current servo fluctuation direction is identical with a last servo fluctuation direction every once in a unit time within the predetermined period; and increase the amount of the reciprocating jitter of the angular position of the output shaft of the robot servo by 1, if the current servo fluctuation direction is not identical with the last servo fluctuation direction. In which, the determine the current servo fluctuation direction includes: determining whether a current angular position is identical with a last angular position; determining that the current servo fluctuation direction is identical with the last servo fluctuation direction, if the current angular position is identical with the last angular position; and determining whether a current servo angle is greater than a last servo angle, and determining that the current servo fluctuation direction is positive if the current servo angle is greater than the last servo angle while determining that the current servo fluctuation direction is negative if the current servo angle is not greater than the last servo angle.

In this embodiment, a second predetermined period is set. In which, the second predetermined period is equal to the first predetermined period plus the predetermined period. As shown in FIG. 2, after the robot servo enters the lock position state, the timing is started and incremented by 1 to determine the magnitude of the counted time and the first predetermined period. If it is determined that the magnitude of the counted time is less than or equal to the first predetermined period, the amount of the reciprocating jitter of the angular position of the output shaft of the robot servo in the predetermined period is not counted, that is, the robot servo is not counted to be in the jitter state when it just enters the lock position state to be unstable if the magnitude of the counted time is greater than the first predetermined period, it is determined whether the current angular position is identical with the last angular position.

If the current angular position is identical with the last angular position, it is determined that the current robot servo fluctuation direction is identical with the last robot servo fluctuation direction, and the last robot servo fluctuation direction is set as the current robot servo fluctuation direction, and the last angular position is set as the current angular position, which is for determining whether the current robot servo fluctuation direction is identical with the last robot servo fluctuation direction and whether the current angular position is identical with the last angular position in the next time.

If the current angular position is not identical with the last angular position, the magnitude of the current servo angle and the last servo angle are compared. If the current servo angle is greater than the last servo angle, it is determined that the current robot servo fluctuation direction is positive; if the current servo angle is smaller than or equal to the last servo angle, it is determined that the current robot servo fluctuation direction is negative, and continues to determine whether the current robot servo fluctuation direction is identical with the last robot servo fluctuation direction. If the current robot servo fluctuation direction is identical with the last robot servo fluctuation direction, the last robot servo fluctuation direction is set as the current robot servo fluctuation direction, and the last angular position is set as the current angular position, which is for determining whether the current robot servo fluctuation direction is identical with the last robot servo robot fluctuation direction and whether the current angular position is identical with the last angular position in the next time; if the current robot servo fluctuation direction is not identical with the last robot servo fluctuation direction, the amount of the reciprocating jitter of the angular position of the output shaft of the robot servo is increased by 1, and the last robot servo fluctuation direction is set as the current robot servo fluctuation direction, the last angular position is set as the current angular position, which is for determining whether the current robot servo fluctuation direction is identical with the last robot servo fluctuation direction and whether the current angular position is identical with the last angular position in the next time.

Optionally, the jitter determining module 302 is specifically configured to: determine whether the amount of the reciprocating jitter of the angular position of the output shaft of the robot servo is greater than the predetermined fluctuation value; and determine that the robot servo is in the jitter state, if the amount of the reciprocating jitter of the angular position of the output shaft of the robot servo is greater than the predetermined fluctuation value.

In this embodiment, as shown in FIG. 2, if the timing of the lock position state is greater than the second predetermined period, the amount of the reciprocating jitter of the angular position of the output shaft of the robot servo counted in the predetermined period and the predetermined fluctuation value are compared. If the amount of the reciprocating jitter of the angular position of the output shaft of the robot servo is greater than the predetermined fluctuation value, it is determined that the robot servo is in the jitter state, the timing of the lock position state is set as the first predetermined period, and the amount of reciprocating jitter of the angular position of the output shaft of the robot servo is cleared to zero so as to terminate the detection of whether the robot servo is in the jitter state. If the amount of reciprocating jitter of the angular position of the output shaft of the robot servo is smaller than or equal to the predetermined fluctuation value, the timing of the lock position state is set as the first predetermined period, and the amount of reciprocating jitter of the angular position of the output shaft of the robot servo is cleared to zero so as to terminate the detection of whether the robot servo is in the jitter state.

Optionally, the adjustment module 303 is specifically configured to: determine whether the control parameter(s) of the robot servo have reached a lower limit, if the robot servo is in the jitter state; and decrease the control parameter(s) of the robot servo by 1, if the lower limit is not reached.

In this embodiment, if the robot servo is in the jitter state, it is determined whether the control parameter(s) of the robot servo has reached the lower limit. If the lower limit is not reached, the control parameter(s) of the robot servo are decreased by 1, and the adjustment of the control parameter(s) of the robot servo is terminated.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented robot servo jitter suppression method, comprising executing on a processor steps of:
detecting a deviation angle being the difference between a current movement angle and a target angle of the output shaft of the robot servo, and comparing whether the deviation angle is greater than a predetermined deviation threshold, after the robot servo enters a lock position state for a first predetermined period;
counting an amount of reciprocating jitters of an angular position of an output shaft of a robot servo in a predetermined period, in response to the deviation angle being greater than the predetermined deviation threshold;
determining whether the robot servo is in a jitter state according to the amount of the reciprocating jitters of the angular position of the output shaft of the robot servo and a predetermined fluctuation value; and
suppressing the jitter of the robot servo by adjusting one or more control parameters of the robot servo, in response to the robot servo being in the jitter state.

2. The method according to claim 1, wherein the counting the amount of the reciprocating jitters of the angular position of the output shaft of the robot servo in the predetermined period further comprises;
determining whether a current servo fluctuation direction is identical with a last servo fluctuation direction every once in a unit time within the predetermined period; and
incrementing, by one, the amount of the reciprocating jitters of the angular position of the output shaft of the robot servo, in response to the current servo fluctuation direction being not identical with the last servo fluctuation direction.

3. The method of claim 2, wherein the determining whether the current servo fluctuation direction is identical with the last servo fluctuation direction comprises;
determining whether a current angular position is identical with a last angular position;
determining the current servo fluctuation direction being identical with the last servo fluctuation direction, in response to the current angular position being identical with the last angular position; and
determining whether a current servo angle is greater than a last servo angle, and determining the current servo fluctuation direction being positive in response to the current servo angle being greater than the last servo angle while determining the current servo fluctuation direction being negative in response to the current servo angle being not greater than the last servo angle.

4. The method of claim 1, wherein the determining whether the robot servo is in the jitter state according to the amount of the reciprocating jitters of the angular position of the output shaft of the robot servo and the predetermined fluctuation value comprises:
determining whether the amount of the reciprocating jitters of the angular position of the output shaft of the robot servo is greater than the predetermined fluctuation value; and
determining the robot servo being in the jitter state, in response to the amount of the reciprocating jitters of the angular position of the output shaft of the robot servo being greater than the predetermined fluctuation value.

5. The method of claim 1, wherein the suppressing the jitter of the robot servo by adjusting the one or more control parameters of the robot servo, in response to the robot servo being in the jitter state comprises:
determining whether the one or more control parameters of the robot servo have reached a lower limit, in response to the robot servo being in the jitter state; and
decrementing, by one, the one or more control parameters of the robot servo, in response to the lower limit being not reached.

6. The method of claim 1, wherein each of the one or more control parameters is a parameter of an automatic control related algorithm.

7. A robot servo jitter suppression device comprising a processor and a memory having stored therein instructions, which when executed by the processor, cause the processor to:
detect a deviation angle being the difference between a current movement angle and a target angle of the output shaft of the robot servo, and compare whether the deviation angle is greater than a predetermined deviation threshold, after the robot servo enters a lock position state for a first predetermined period;
count an amount of reciprocating jitters of an angular position of an output shaft of a robot servo in a predetermined period, in response to the deviation angle being greater than the predetermined deviation threshold;
determine whether the robot servo is in a jitter state according to the amount of the reciprocating jitters of the angular position of the output shaft of the robot servo and a predetermined fluctuation value; and
suppress the jitter of the robot servo by adjusting one or more control parameters of the robot servo, in response to the robot servo being in the jitter state.

8. The device according to claim 7, wherein the memory has stored therein instructions, which when executed by the processor, cause the processor to:
determine whether a current servo fluctuation direction is identical with a last servo fluctuation direction every once in a unit time within the predetermined period; and
increment, by one, the amount of the reciprocating jitters of the angular position of the output shaft of the robot servo, in response to the current servo fluctuation direction being not identical with the last servo fluctuation, direction.

9. The device according to claim 8, wherein the memory has stored therein instructions, which when executed by the processor, cause the processor to:
determine whether a current angular position is identical with a last angular position;
determine the current servo fluctuation direction being identical with the last servo fluctuation direction, in response to the current angular position being identical with the last angular position; and
determine whether a current servo angle is greater than a last servo angle, and determine the current servo fluctuation direction being positive in response to the current servo angle being greater than the last servo angle while determining the current servo fluctuation direction being negative in response to the current servo angle being not greater than the last servo angle.

10. The device of claim 7, wherein the memory has stored therein instructions, which when executed by the processor, cause the processor to:
determine whether the amount of the reciprocating jitters of the angular position of the output shaft of the robot servo is greater than the predetermined fluctuation value; and determine the robot servo being in the jitter state, in response to the amount of the reciprocating jitters of the angular position of the output shaft of the robot servo being greater than the predetermined fluctuation value.

11. The device, of claim 7, wherein the memory has stored therein instructions, which when executed by the processor, cause the processor to:

determine whether the one or more control parameters of the robot servo have reached a lower limit, in response to the robot servo being in the jitter state; and decrement, by one, the one or more control parameters of the robot servo, in response to the lower limit being not reached.

12. The device of claim 7, wherein each of the one or more control parameters is a parameter of an automatic control related algorithm.

\* \* \* \* \*